United States Patent
Zhang

(10) Patent No.: US 10,656,325 B2
(45) Date of Patent: May 19, 2020

(54) LIQUID CRYSTAL DISPLAY AND BACKLIGHT MODULE THEREOF

(71) Applicant: HUIZHOU CHINA STAR OPTOELECTRONICS TECHNOLOGY CO., LTD., Huizhou Guangdong (CN)

(72) Inventor: Yanxue Zhang, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 170 days.

(21) Appl. No.: 15/754,284

(22) PCT Filed: Jan. 18, 2018

(86) PCT No.: PCT/CN2018/073211
§ 371 (c)(1),
(2) Date: Feb. 21, 2018

(87) PCT Pub. No.: WO2019/127734
PCT Pub. Date: Jul. 4, 2019

(65) Prior Publication Data
US 2019/0383994 A1    Dec. 19, 2019

(30) Foreign Application Priority Data
Dec. 29, 2017  (CN) .......................... 2017 1 1487119

(51) Int. Cl.
*F21V 7/04*      (2006.01)
*F21V 8/00*      (2006.01)
*G02F 1/13357*   (2006.01)

(52) U.S. Cl.
CPC ..... *G02B 6/0086* (2013.01); *G02F 1/133608* (2013.01)

(58) Field of Classification Search
CPC ................................................ G02F 1/133608
See application file for complete search history.

(56) References Cited

U.S. PATENT DOCUMENTS 7,226,201 B1 *  6/2007  Li ........................ G02B 6/0088
                                                        349/58
8,749,728 B2 *  6/2014  Zhang ............... G02F 1/133308
                                                        349/58
(Continued)

FOREIGN PATENT DOCUMENTS

CN        200997031 Y      12/2007
CN        102628583 A      8/2012
(Continued)

*Primary Examiner* — Matthew J. Peerce
(74) *Attorney, Agent, or Firm* — Hemisphere Law, PLLC; Zhigang Ma

(57) ABSTRACT

The present invention provides a liquid crystal display and a backlight module thereof, the backlight module includes a back plate, a backlight source and a frame glue, the backlight source is disposed on the back plate, the frame glue comprises a fixing member and an adjusting member, the fixing member fixedly connects with the back plate, the adjusting member comprises two first frames disposed opposite to each other in a first direction and two second frames disposed opposite to each other in a second direction, the two first frames and the two second frames detachably connect with the fixing member, the two first frames and the two second frames are used for fixing the display panel. When the backlight module is applied to display panels of different sizes, only the adjusting member corresponding to the display panel needs to be selected.

12 Claims, 3 Drawing Sheets

(56) References Cited

U.S. PATENT DOCUMENTS

| | | |
|---|---|---|
| 9,436,309 B2 | 9/2016 | Jeong |
| 2006/0139963 A1 | 6/2006 | Chang et al. |
| 2008/0074877 A1* | 3/2008 | Hsieh ................ G02F 1/133604 362/249.01 |
| 2008/0130313 A1* | 6/2008 | Kim ...................... G02B 6/009 362/611 |
| 2010/0277664 A1* | 11/2010 | Kim .................... G02B 6/0085 349/58 |
| 2014/0022486 A1* | 1/2014 | Kuo ......................... H05K 7/18 349/58 |
| 2016/0209697 A1* | 7/2016 | Chang ............... G02F 1/133308 |

FOREIGN PATENT DOCUMENTS

| | | |
|---|---|---|
| CN | 102929012 A | 2/2013 |
| CN | 105158988 A | 12/2015 |

\* cited by examiner

LIQUID CRYSTAL DISPLAY AND BACKLIGHT MODULE THEREOF

RELATED APPLICATIONS

The present application is a National Phase of International Application Number PCT/CN2018/073211, filed Jan. 18, 2018, and claims the priority of China Application No. 201711487119.6, filed Dec. 29, 2017.

FIELD OF THE DISCLOSURE

The disclosure relates to a display technical field, and more particularly to a liquid crystal display and a backlight module thereof.

BACKGROUND

With the continuous development of liquid crystal display technology, the trend of product differentiation is becoming increasingly obvious. Display panels of different sizes need to be collocated with different backlight modules, resulting in increased development costs and repetitive development cycles, and in turn leads to a correspondingly longer development cycle. In particular, for some panel manufacturers, when developing the liquid crystal panel, different backlight modules have to be developed for different display panels. As the product is updated faster and faster, the production cost of panel manufacturers will be continuously increased. Therefore, there is a need to provide a backlight module that can accommodate display panels of different sizes.

SUMMARY

In order to solve the insufficiency of the conventional technology, the present invention provides a liquid crystal display and a backlight module thereof, the backlight module is capable to accommodate display panels with different sizes, thereby reducing costs and saving resources.

The specific technical solution proposed by the present invention is as follows: A backlight module is provided, the backlight module including: a back plate, a backlight source and a frame glue, the backlight source is disposed on the back plate, the frame glue includes a fixing member and an adjusting member, the fixing member fixedly connects with the back plate, the adjusting member includes two first frames disposed opposite to each other in a first direction and two second frames disposed opposite to each other in a second direction, the two first frames and the two second frames detachably connect with the fixing member, the two first frames and the two second frames are used for fixing the display panel.

Further, buckles are provided on two opposite sides of the fixing member, each of the two first frames is provided with hooks corresponding to the buckles.

Further, two adjacent first frame and the second frame are fixedly connected at a right angle, a plurality of the buckles are disposed on the fixing member, by connecting the hooks to the plurality of the buckles respectively, a distance between the two first frames in the first direction and a distance between the two second frames in the second direction are adjusted.

Further, four sides of the fixing member are provided with buckles, the two first frames and the two second frames are provided with hooks.

Further, a plurality of the buckles are disposed on the fixing member along the first direction, a plurality of the buckles are disposed on the fixing member along the second direction, by connecting the hooks on the two first frames with the plurality of buckles along the first direction, a distance between the two first frames along the first direction is adjusted, by connecting the hooks on the two second frames with the plurality of buckles along the second direction, a distance between the two second frames along the second direction is adjusted.

Further, the first frame includes a first extending portion, a first connecting portion, and a second extending portion disposed along the first direction, the first extending portion and the second extending portion are respectively connected to two sides of the first connecting portion, the hooks are disposed on the first extending portion and the second extending portion is used for supporting the display panel.

Further, the second frame includes a third extending portion, a second connecting portion, and a fourth extending portion disposed along the second direction, the third extending portion and the fourth extending portion are respectively connected to two sides of the second connecting portion and the fourth extension portion is used for supporting the display panel.

Further, a plurality of first positioning portions are disposed on the first frame protruding toward the second extending portion, a plurality of second positioning portions are disposed on the second frame protruding toward the fourth extending portion.

The present invention also provides a liquid crystal display including a display panel and the backlight module as described above.

The backlight module of the present invention includes a frame glue, the frame glue includes a fixing member and an adjusting member, the adjusting member includes two first frames and two second frames, the two first frames and the two second frames are detachably connected with the fixing member. The two first frames and the two second frames are used for fixing the display panel. When the backlight module is applied to display panels with different sizes, only need to select the corresponding adjusting member corresponding to the display panel, so that the backlight module is suitable for display panels of different sizes, reducing the cost and saving resources.

DETAILED DESCRIPTION OF PREFERRED EMBODIMENTS

Figure 1:
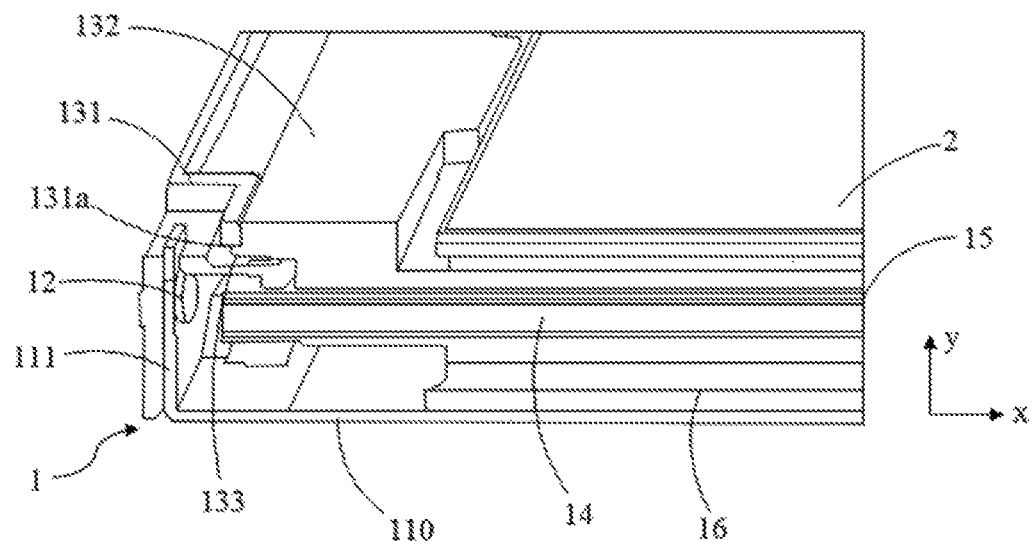
FIG. 1 is a schematic structural view of the liquid crystal display in the first embodiment.

Hereinafter, embodiments of the present invention will be described in detail with reference to the accompanying drawings. However, the invention may be embodied in many different forms and should not be construed as limited to the specific embodiments set forth herein. Rather, these embodiments are provided to explain the principles of the invention and its practical application to thereby enable those of ordinary skill in the art to understand various embodiments of the invention and various modifications as are suited to the particular use contemplated. In the drawings, the same reference numerals will always be used to refer to the same elements.

The liquid crystal display provided by the present invention includes a backlight module and a display panel, the backlight module provides a light source for the display panel. The backlight module includes a back plate, a backlight source and a frame glue. The backlight source is disposed on the back plate. The frame glue includes a fixing member and an adjusting member. The fixing member is fixedly connected with the back plate. The adjusting member includes two first frames disposed opposite to each other in a first direction and two second frames disposed opposite to each other in a second direction, the two first frames and the two second frames are detachably connected with the fixing member, the two first frames and the two second frames are used for fixing the display panel.

The backlight module is matched with the display panel with the largest size, and the backlight module is adapted to the display panels with different sizes by selecting the adjusting members corresponding to the display panels with different sizes, thereby reducing the cost and saving resources.

The backlight module provided by the present invention may be a direct-type backlight module or an edge-type backlight module. The following describes the backlight module of the present invention by taking the edge-type backlight module as an example, and the principle of the direct-type backlight module is similar to that of the edge-type backlight module, and details are not described herein again. Certainly, the backlight module is the edge-type backlight module here, which is merely shown by way of embodiment and is not intended to be limiting.

First Embodiment

Figure 2:
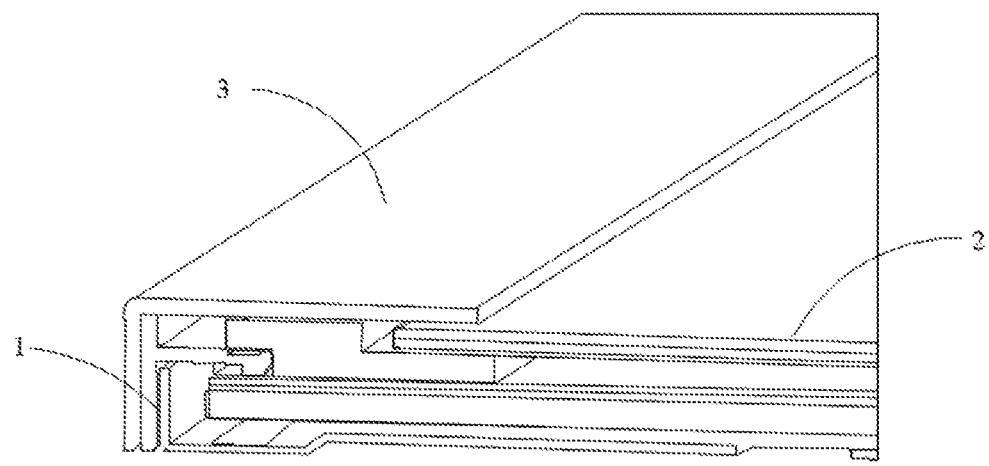
FIG. 2 is a schematic view of another structure of the liquid crystal display in the first embodiment.

Referring to FIG. 1 and FIG. 2, the liquid crystal display of the present embodiment includes a backlight module 1 and a display panel 2. The backlight module 1 includes a back plate 11, a backlight source 12, and a frame glue 13. The backlight source 12 is disposed on the back plate 11. The frame glue 13 includes a fixing member 131 and an adjusting member 132. The fixing member 131 is fixedly connected with the back plate 11. The adjusting member 132 is detachably connected to the fixing member 131, and the adjusting member 132 is used for fixing the display panel 2. The adjusting member 132 in this embodiment includes two first frames 100 disposed opposite to each other in a first direction and two second frames 101 disposed opposite each other in a second direction, the two first frames 100 and the two second frames 101 are detachably connected to the fixing member 131, the two first frames 100 and the two second frames 101 are for fixing the display panel 2. The first direction is the x direction in FIG. 1, and the second direction is the y direction in FIG. 1.

Figure 3:
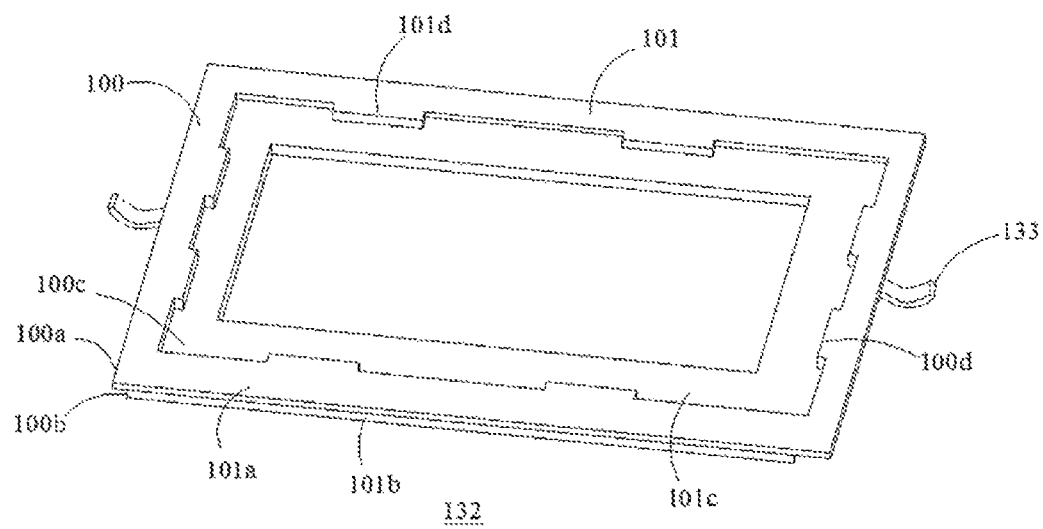
FIG. 3 is a schematic structural view of the adjusting member in the first embodiment.
Figure 6:
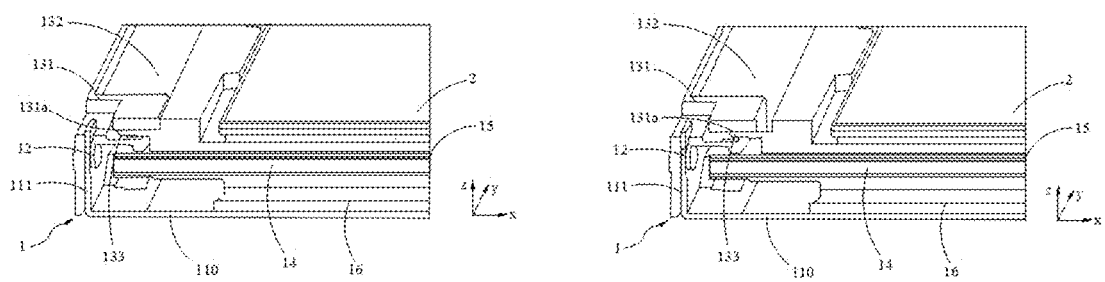
FIG. 6 is a schematic structural view of the fixing member and the adjusting member in the third embodiment.

As shown in FIG. 3 and FIG. 6, the adjusting member 132 in the present embodiment is integrally formed. That is, the two first frames 100 and the two second frames 101 are fixedly connected, the adjusting member 132 is a ring structure with a rectangular shape. Specifically, two opposite sides of the fixing member 131 are provided with buckles 131a, that is, the fixing members 131 are provided with buckles 131a on both sides in the first direction, that is, the x direction, and each of the two first frames 100 is provided with hooks 133 corresponding to the buckles 131a.

In this embodiment, buckles 131a may be provided on both sides of the fixing member 131 in the second direction, that is, in the y direction. Each of the two second frames 101 is provided with hooks 133 corresponding to the buckles 131a. Preferably, both the two first frames 100 and the two second frames 101 are provided with buckles 131a, the hooks 133 are provided on four sides of the fixing member 131. In this way, the adjusting member 132 can be better fixed on the fixing member 131.

The first frame 100 includes a first extending portion 100a, a first connecting portion 100b, and a second extending portion 100c disposed along the first direction, that is, the x direction. The first extending portion 100a and the second extending portion 100c are respectively connected to the first connecting portion 100b, the hooks 133 are disposed on the first extending portion 100a and the second extending portion 100c for supporting the display panel 2. The distance between the two first connecting portions 100b is equal to the length of the display panel 2 in the first direction, that is, the x direction.

The second frame 101 includes a third extending portion 101a, a second connecting portion 101b, and a fourth extending portion 101c disposed along the second direction, that is, the y direction. The third extending portion 101a and the fourth extending portion 101c respectively connected to the second connecting portion 101b and the fourth extension portion 101c is used for supporting the display panel 2. The distance between the two second connecting portions 101b is equal to the length of the display panel 2 in the second direction, that is, the y direction.

In order to facilitate heat dissipation, the first frame 100 is provided with a plurality of first positioning portions 100d protruding toward the second extending portion 100c. The second frame 101 is provided with a plurality of second positioning portions 101d protruding toward the fourth extending portion 101c. The plurality of first positioning portions 100d are disposed at equal intervals, and the plurality of second positioning portions 101d are disposed at equal intervals. The distance between the first positioning portions 100d along the both sides of the first direction, that is, of the x direction is equal to the length of the display panel 2 along the first direction, that is, the x direction, the distance between the second positioning portions 101d along the both sides of the second direction, that is, the y direction is equal to the length of the display panel 2 along the second direction, that is, the y direction. By disposing the plurality of first positioning portions 100d and the plurality of second positioning portions 101d can prevent the edge of the display panel 2 from completely adhering to the edges of the first connecting portion 100b and the second connecting portion 101b to weaken the heat dissipation effect of the display panel 2.

In addition, the back plate 11 includes a bottom plate 110 and a side plate 111. The side plate 111 is perpendicular to the bottom plate 110. The backlight module 1 further includes a light guide plate 14, an optical film set 15 and a reflection sheet 16. The light guide plate 14 is disposed above the bottom plate 110. The reflection sheet 16 is disposed between the light guide plate 14 and the bottom plate 110. The optical film set 15 is disposed between the light guide plate 14 and the display panel 2. The backlight source 12 is disposed opposite to a light incident surface of the light guide plate 14, the display panel 2 is disposed opposite to a light emitting surface of the light guide plate 14.

The liquid crystal display in this embodiment further includes a front frame 3, the front frame 3 is disposed on an outer side of the display panel 2 and the frame glue 13, the front frame 3 is for fixing the backlight module 1 and the display panel 2.

In this embodiment, the backlight module 1 can be applied to the display panels 2 with different sizes by replacing different adjusting members 132. Wherein, the distances between the first positioning portions 100d along the both sides of the first direction, that is, the x direction in the different adjusting members 132 and the distances between the second positioning portions 101d along the both sides of the second direction, that is, the y direction are not equal to each other, so as to corresponding to the display panels 2 with different size.

Second Embodiment

Referring to FIG. 3, the difference between this embodiment and the first embodiment lies in that two adjacent first frame 100 and the second frame 101 are fixedly connected at a right angle, that is, two adjacent first frame 100 and the second frame 101 form a L-shaped structure, the adjusting member 132 includes two L-shaped structures.

The fixing member 131 is provided with a plurality of buckles 131a. The arranging direction of the plurality of buckles 131a is parallel to the direction of the diagonal connection of the two L-shaped structures (as shown in the z direction in FIG. 3), the hook 133 may be disposed on only one L-shaped structure, or the hooks 133 may be disposed on both L-shaped structures. The hooks 133 may be disposed on the first frame 100 or may be disposed on the second frame 101.

When the hook 133 is provided on only one L-shaped structure, by adjusting the hooks 133 on the L-shaped structure to engage with the different buckles 131 to adjust the distance between the first positioning portions 100d along the both sides of the first direction, that is, the x direction and the distance between the first positioning portions 100d along the both sides of the second direction, that is, the y direction.

When the hooks 133 are arranged on both of the two L-shaped structures, the hooks 133 on both of the two L-shaped structures can be simultaneously adjusted to engage with the different buckles 131a to adjust the distance between the first positioning portions 100d along the both sides of the first direction, that is, the x direction and the distance between the first positioning portions 100d along the both sides of the second direction, that is, the y direction.

Compared with the first embodiment, in the present embodiment, the backlight module 1 can be applied to the display panels 2 with different sizes without replacing the adjusting member 132, thereby further saving resources and reducing costs.

Third Embodiment

Figure 4:
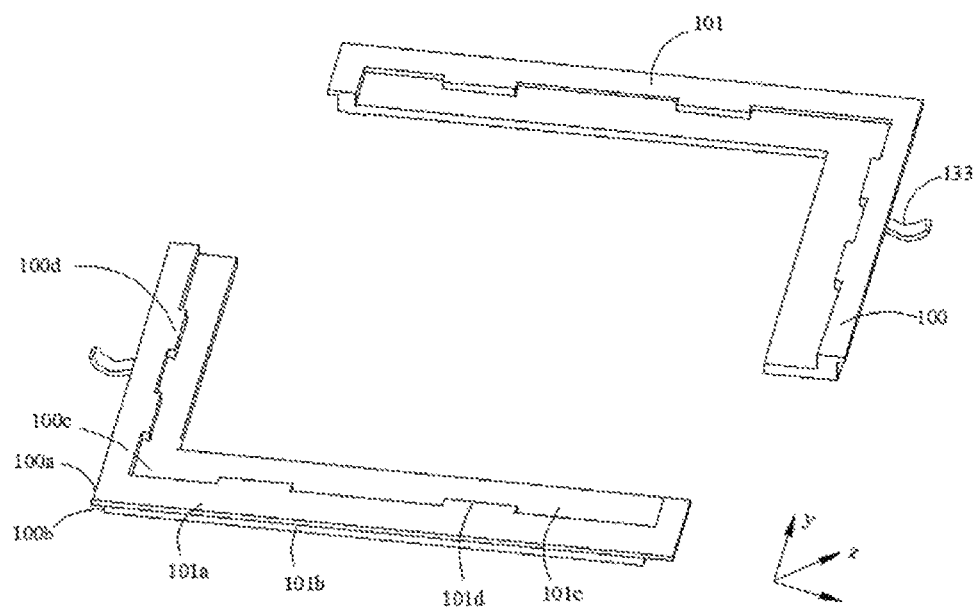
FIG. 4 is a schematic structural view of the adjusting member in the second embodiment
Figure 5:
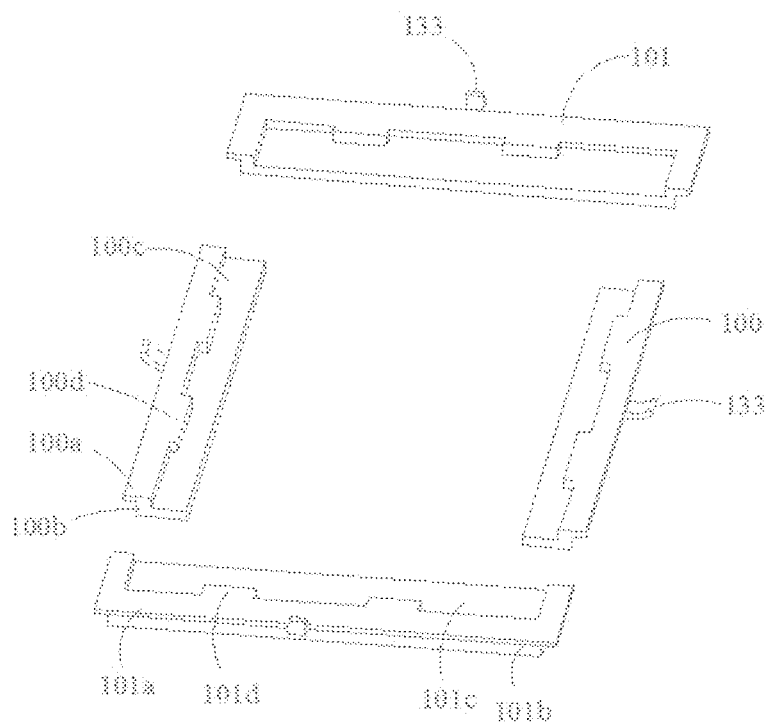
FIG. 5 is a schematic structural view of the adjusting member in the third embodiment.

Referring to FIG. 4, the difference between this embodiment and the second embodiment lies in that the two first frames 100 and the two second frames 101 are not fixed to each other.

A plurality of buckles 131a are provided on four sides of the fixing member 131, the hooks 133 are disposed on the two first frames 100 and the two second frames 101. The plurality of buckles 131a disposed on the two sides of the first direction of the fixing member 131 are arranged in a straight line along the first direction, that is, the x direction.

The plurality of buckles 131a disposed on the two sides of the second direction of the fixing member 131 are arranged in a straight line along the second direction, that is, the y direction. By connecting the hooks 133 on the two first frames 100 with the plurality of buckles 131a in the first direction, the distances between the two first frames 100 in the first direction can be adjusted; by connecting the hooks 133 on the two second frames 101 with the plurality of buckles 131a in the second direction, the distance between the two second frames 101 in the second direction can be adjusted.

The two first frames 100 and the two second frames 101 are both disposed to be detachably connected to the fixing member 131 simultaneously, so that the two first frames 100 and the two second frames 101 can both be located in the middle of the four sides of the display panel 2, so that the force of the display panel 2 is uniform, and to improve the stability of the liquid crystal display.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A backlight module, comprising: a back plate, a backlight source and a frame, the backlight source is disposed on the back plate, the frame comprises a fixing member and an adjusting member, the fixing member fixedly connects with the back plate, the adjusting member comprises two first rails disposed opposite to each other in a first direction and two second rails disposed opposite to each other in a second direction, the two first rails and the two second rails detachably connect with the fixing member, the two first rails and the two second rails are used for fixing the display panel,
wherein the first rail comprises a first extending portion, a first connecting portion, and a second extending portion disposed along the first direction, the first extending portion and the second extending portion are respectively connected to two sides of the first connecting portion, the second extending portion is used for supporting the display panel,
wherein the second rail comprises a third extending portion, a second connecting portion, and a fourth extending portion disposed along the second direction, the third extending portion and the fourth extending portion are respectively connected to two sides of the second connecting portion and the fourth extension portion is used for supporting the display panel, and
wherein a plurality of first positioning portions are disposed on the first rail protruding toward the second extending portion, a plurality of second positioning portions are disposed on the second rail protruding toward the fourth extending portion, the first positioning portions and the second positioning portions are respectively located at a middle of the first rail and at a middle of the second rail, and a plurality of recesses are disposed between the first positioning portions and between the second positioning portions.

2. The backlight module according to claim 1, wherein buckles are provided on two opposite sides of the fixing member, each of the two first rails is provided with hooks corresponding to the buckles.

3. The backlight module according to claim 2, wherein two adjacent first rail and the second rail are fixedly connected at a right angle, a plurality of the buckles are disposed on the fixing member, by connecting the hooks to the plurality of the buckles respectively, a distance between the two first rails in the first direction and a distance between the two second rails in the second direction are adjusted.

4. The backlight module according to claim 1, wherein four sides of the fixing member are provided with buckles, the two first rails and the two second rails are provided with hooks.

5. The backlight module according to claim 4, wherein a plurality of the buckles are disposed on the fixing member along the first direction, a plurality of the buckles are disposed on the fixing member along the second direction, by connecting the hooks on the two first rails with the plurality of buckles along the first direction, a distance between the two first rails along the first direction is adjusted, by connecting the hooks on the two second rails with the plurality of buckles along the second direction, a distance between the two second rails along the second direction is adjusted.

6. The backlight module according to claim 2, wherein the hooks are disposed on the first extending portion and the second extending portion is used for supporting the display panel.

7. A liquid crystal display, comprising: a display panel and a backlight module, the backlight module comprises a back plate, a backlight source and a frame, the backlight source is disposed on the back plate, the frame comprises a fixing member and an adjusting member, the fixing member fixedly connects with the back plate, the adjusting member comprises two first rails disposed opposite to each other in a first direction and two second rails disposed opposite to each other in a second direction, the two first rails and the two second rails detachably connect with the fixing member, the two first rails and the two second rails are used for fixing the display panel, wherein the first rail comprises a first extending portion, a first connecting portion, and a second extending portion disposed along the first direction, the first extending portion and the second extending portion are respectively connected to two sides of the first connecting portion, the second extending portion is used for supporting the display panel, wherein the second rail comprises a third extending portion, a second connecting portion, and a fourth extending portion disposed along the second direction, the third extending portion and the fourth extending portion are respectively connected to two sides of the second connecting portion and the fourth extension portion is used for supporting the display panel, and wherein a plurality of first positioning portions are disposed on the first rail protruding toward the second extending portion, a plurality of second positioning portions are disposed on the second rail protruding toward the fourth extending portion, the first positioning portions and the second positioning portions are respectively located at a middle of the first rail and at a middle of the second rail, and a plurality of recesses are disposed between the first positioning portions and between the second positioning portions.

8. The liquid crystal display according to claim 7, wherein buckles are provided on two opposite sides of the fixing member, each of the two first rails is provided with hooks corresponding to the buckles.

9. The liquid crystal display according to claim 8, wherein two adjacent first rail and the second rail are fixedly connected at a right angle, a plurality of the buckles are disposed on the fixing member, by connecting the hooks to the plurality of the buckles respectively, a distance between the two first rails in the first direction and a distance between the two second rails in the second direction are adjusted.

10. The liquid crystal display according to claim 7, wherein four sides of the fixing member are provided with buckles, the two first rails and the two second rails are provided with hooks.

11. The liquid crystal display according to claim 10, wherein a plurality of the buckles are disposed on the fixing member along the first direction, a plurality of the buckles are disposed on the fixing member along the second direction, by connecting the hooks on the two first rails with the plurality of buckles along the first direction, a distance between the two first rails along the first direction is adjusted, by connecting the hooks on the two second rails with the plurality of buckles along the second direction, a distance between the two second rails along the second direction is adjusted.

12. The liquid crystal display according to claim 8, the hooks are disposed on the first extending portion and the second extending portion is used for supporting the display panel.

* * * * *